(12) United States Patent
Dietmayer

(10) Patent No.: US 6,534,969 B1
(45) Date of Patent: Mar. 18, 2003

(54) OFFSET-COMPENSATED ANGLE MEASURING SYSTEM

(75) Inventor: Klaus Dietmayer, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/426,521

(22) Filed: Oct. 26, 1999

(30) Foreign Application Priority Data

Oct. 29, 1998 (DE) ......................................... 198 49 910

(51) Int. Cl.$^7$ ................................................ G01B 7/30
(52) U.S. Cl. ............................ 324/207.12; 324/207.21; 324/252; 327/510
(58) Field of Search ................. 324/207.12, 207.21, 324/225, 251, 252; 338/32 R; 327/510, 511

(56) References Cited

PUBLICATIONS

"Sensor Conditioning Electronics" Philips Semiconductors data sheet UZZ9000, Dec. 3, 1996, pp. 2–7.

*Primary Examiner*—Walter E. Snow
(74) *Attorney, Agent, or Firm*—Aaron Waxler

(57) ABSTRACT

In a device for measuring an angle $\phi$ between a magnetic field and an MR sensor (1) which supplies at least two electrical sensor signals x and y mutually 90° phase-shifted, which are supplied to an A/D converter (4) whose output is connected to an angle calculating device (6), the absolute sensor signal value $|r|$ of the two sensor signals x and y is determined from the equation $|r|=\sqrt{y^2+x^2}$ in a total calculation device (7) for the purpose of an automatic and continuous offset compensation of the static and dynamic offsets, and the change in the absolute sensor signal value is determined therefrom in dependence on the calculated angle, whereupon an offset control of the sensor signals x and y is carried out in dependence on said change in absolute value.

8 Claims, 1 Drawing Sheet

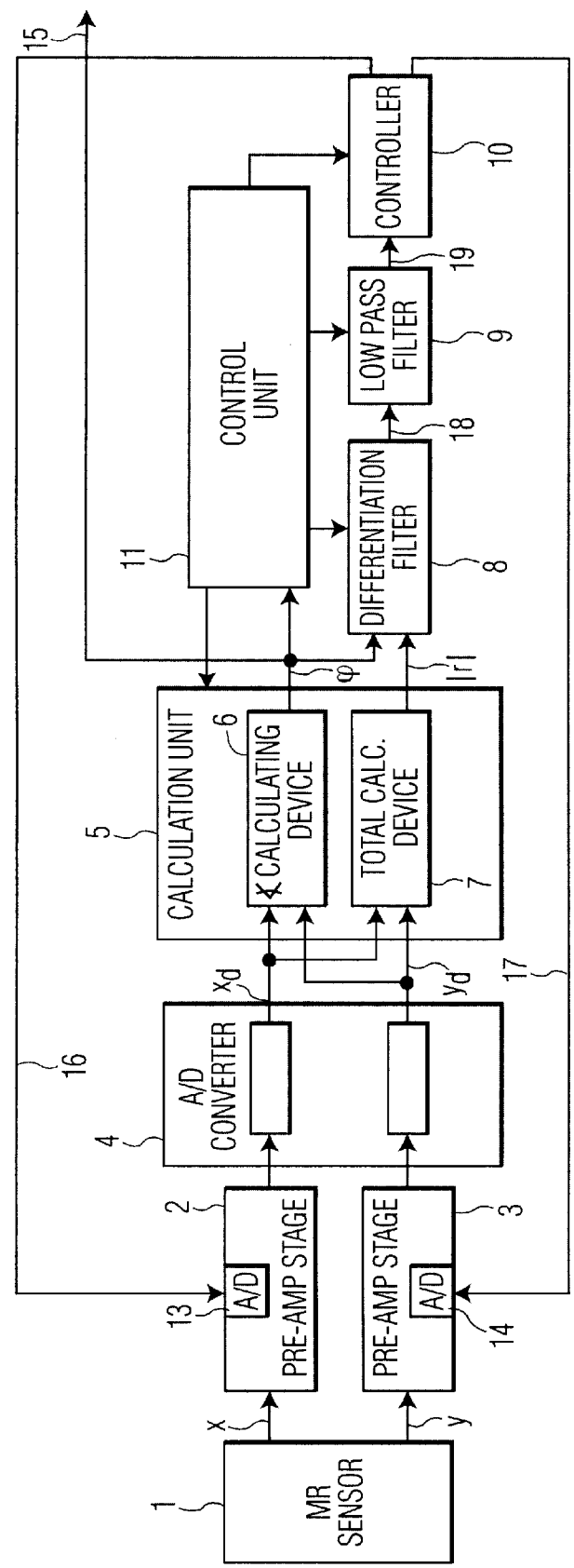

OFFSET-COMPENSATED ANGLE MEASURING SYSTEM

BACKGROUND OF THE INVENTION

The invention relates to a device for measuring an angle between a magnetic field and a magnetoresistive sensor which supplies at least two mutually 90° phase-shifted electrical sensor signals which are supplied to an analog/digital converter, and downstream of which an angle calculating device is connected.

Such devices for the contactless measuring of angles are used in the field of motorcars, for example for detecting the angles of throttle valves or the steering angle. This angle measurement is based on the magnetoresistive effect. A ferromagnetic layer in the sensor through which a current is passed is exposed to a magnetic field here, as a result of which the resistance of the layer changes. A change in the resistance is caused through a change in the position of the sensor in relation to the magnetic field. Such a sensor is referred to as MR sensor hereinafter.

The Philips Semiconductors data sheet UZZ9000 describes a system which calculates an angle between an MR sensor and a permanent magnet from two signals which are 90° phase-shifted relative to one another. This sensor comprises two mutually interlocking Wheatstone bridges which are mutually arranged at an angle of 45° and which supply sinusoidal signals phase-shifted by 90°. These Wheatstone bridges exhibit a drift behavior which is dependent on the individual device and not systematic. Said bridge circuits do not operate fully symmetrically owing to manufacturing tolerances of the resistances, which gives rise to a static offset in the sensor signals. To balance the sensor signals affected by static offset in the known system, a once and for all compensation of the static offset is carried out at room temperature by the application of external compensation voltages. In addition, dynamic offsets arise during operation of the angle measuring device owing to temperature changes and ageing. These offsets falsify the measuring result considerably and are not dealt with in the once and for all compensation.

SUMMARY OF THE INVENTION

It is an object of the invention to provide a device which carries out an automatic offset compensation of the static and dynamic offsets continuously.

This object is achieved in that the absolute value $|r|$ of the two sensor signals x and y is calculated in a total calculation device from the equation $|r|=\sqrt{y^2+x^2}$, in that the change in the absolute value of the sensor signals is determined in dependence on the calculated angle, and in that an offset control of the sensor signals x and y is carried out in dependence on said change in absolute value.

The device according to the invention comprises an MR sensor which supplies two electrical sensor signals which are mutually phase-shifted by 90° upon exposure to a magnetic field. After said two sinusoidal sensor signals have been A/D converted, the angle between the MR sensor and the magnetic field is calculated in the angle calculating device. Since these two sinusoidal signals are at right angles to one another, the complex number theory can accordingly be applied, wherein the first sensor signal x, for example, is the real component and the second sensor signal y is the imaginary component of a complex number, or the sensor signal x represents the sine and the sensor signal y represents the cosine of one and the same angle. The absolute value of these two sensor signals is calculated in the total calculation device. In addition, the change in absolute value is also calculated for the calculated angle between the MR sensor and the magnetic field. A controller calculates from this change in absolute value, or alternatively from the angle gradient, a DC voltage which is supplied to controllable preamplifiers so as to influence the two sensor signals coming from the MR sensor such that the offsets to which the sensor signals are subject are compensated, and accordingly the change in absolute value of the angle is reduced and indeed eliminated in the ideal case. The controllable preamplifiers are connected upstream of the AMD converter and amplify the relevant signal originating from the sensor. An externally supplied DC voltage which is dependent on the offset values calculated by the controller is additively superimposed on the sensor signals in the controllable preamplifier. The offsets which falsify the test result are thus compensated, so that no change in the absolute value of the angle will be present upon the next calculation of the absolute value change.

An advantage of this invention over the prior art is that the calculation of the change in absolute value compensates not only dynamic offsets which arise owing to ageing and temperature fluctuations during the measurement, but also the static offsets which arise from the non-symmetrical central voltage of the Wheatstone bridges which are present in the sensor. A continuous offset compensation is possible because the calculation of the absolute value takes place in parallel to the calculation of the angle in the calculation device.

It is found to be advantageous in an embodiment of the invention to supplement the device with a memory in which the offset values are stored so as to achieve a faster compensation of the offsets at the start of an angle measurement.

The absolute sensor signal value is differentiated with respect to the angle, whereby high-frequency interference signals are intensified, so that it is advantageous to combine the differentiation with a low-pass filtering operation.

It may be advantageously provided that the sensor signals are first A/D converted and then influenced by means of a correction signal calculated in dependence on the change in absolute value, such that the change in absolute value is reduced and eliminated.

In a further embodiment of the invention, a CORDIC algorithm is used for calculating the angle and the absolute value of the sensor signal. The CORDIC algorithm is an approximation method. It is based on basic mathematical functions, such as addition and arithmetic shifting, as well as on a read-out of tabled values. In the angle determination, a pointer defined by its co-ordinates in the complex plane is rotated stepwise until the imaginary component disappears and the pointer comes to lie on the real axis after a number of rotation operations. Once this termination criterion has been reached, the desired angle is derived from the number of rotation steps.

BRIEF DESCRIPTION OF DRAWINGS

An embodiment will now be explained in more detail below with reference to the drawings.

The sole FIGURE of the drawings shows a block diagram of the device according to the invention.

DETAILED DESCRIPTION OF THE PRIMARY EMBODIMENT

FIG. 1 shows an angle measuring device for the contactless measurement of an angle between an MR sensor 1 and a magnetic field (not shown). The magnetoresistive sensor 1 supplies sensor signals x and y. These are supplied to respective preamplifier stages 2 and 3. The preamplifier stages 2 and 3 comprise adjustment devices 13 and 14 for superimposing an externally supplied DC voltage (not shown) on the sensor signals. These adjustment devices 13 and 14 are supplied with control signals which depend on offset values calculated in the controller 10. After the two 90° phase-shifted electrical sensor signals x and y have been amplified in the preamplifier stages 2 and 3, the analog sensor signals x and y are converted into digital sensor signals $x_d$ and $y_d$ in the A/D converter 4. These digital sensor signals $x_d$ and $y_d$ are each fed to an angle calculating device 6 and a total calculation device 7 in a calculation unit 5. The angle calculating device 6 and the total calculation device 7 in the calculation unit 5 are arranged in parallel to one another. The angle calculating device 6 calculates the angle φ between the MR sensor and the magnetic field from the incoming digital sensor signals $x_d$ and $y_d$ by means of the CORDIC algorithm, which angle is supplied to the control unit 11, the differentiation filter 8, and the output 15.

The calculation of the angle φ carried out in this manner only is still incorrect because the sensor signals x and y have not yet been cleared of their offsets. To utilize the change in absolute value for offset compensation in accordance with the invention, the absolute sensor signal value |r| of the sensor signals x and y is calculated in the total calculation device 7 in accordance with the equation $|r|=\sqrt{y^2+x^2}$. The CORDIC algorithm is again used for calculating the absolute sensor signal value |r|. The absolute sensor signal value is supplied to the differentiation filter 8 and subjected to a differentiation in dependence on the calculated angle φ. The signal 18 representing the change in absolute value is low-pass filtered. After the low-pass filtering, the filtered absolute value change signal 19 is fed to the controller 10, in which the offset values of the sensor signals x and y are calculated. The offset values thus calculated are used for generating control signals 16 and 17 which are supplied to the adjustment devices 13 and 14, arranged in the preamplifier stages 2 and 3, so as to superimpose a suitable DC voltage on the sensor signals x and y, thus compensating the offsets. The control unit 11 serves for an intermediate storage of angle values and for controlling time sequences involving the calculation unit 5 with the absolute value calculation device 7 and the angle calculating device 6, as well as the differentiation filter 8, the low-pass filter 9, and the controller 10.

The mathematical relations will now be explained below. The sensor signals x and y supplied by the sensor can be interpreted as the sine and cosine values of one and the same angle φ because of their mutual phase shift of 90°. The orthogonality of the sine and cosine functions renders it possible to consider the values as real and imaginary components of a complex number z=x+jy; thus the calculation rules for complex numbers, in particular the Euler equation $$z=x+jy=r \cdot e^{j\phi} \quad (1)$$

can be applied. The desired angle φ thus simply results from the test signals in accordance with:

$$\varphi = \text{ArcTan}\left(\frac{y}{x}\right) \quad (2)$$

The information on the absolute value is used for determining the offset values. The absolute value of the sensor signals x and y can be calculated as follows:

$$|r|=\sqrt{y^2+x^2} \quad (3)$$

If there is no offset in either of the two sensor signals, i.e. x and y are pure sinusoidal signals, the absolute value function has no dependence on the angle, i.e. the following would be true:

$$\frac{dr}{d\varphi} = 0. \quad (4)$$

If an offset is taken into account, however, the following functional relationship will generally be obtained:

$$\frac{dr}{d\varphi} = (\Delta x \cdot \cos\varphi - \Delta y \cdot \sin\varphi) \quad (5)$$

with:
Δx=offset of bridge x
Δy=offset of bridge y
φ=electrical angle

According to equation (5), the offset for a given angle (0°, 90°, 180°, and 270°) is identical to the change in value of φ (cf. Table 1). This simple relationship may still be utilized in good approximation within a range of at least ±5° around the given angle. It is accordingly possible to use the angle determined in the instantaneous measurement for this purpose. It is not necessary to rely on an external reference then.

TABLE 1

Determination of the offset for given angles

| Angle | Offset Parameter |
|---|---|
| φ = 0° | $\left.\frac{dr}{d\phi}\right|_{\phi=0°} = \Delta x$ |
| φ = 90° | $\left.\frac{dr}{d\phi}\right|_{\phi=90°} = -\Delta y$ |
| φ = 180° | $\left.\frac{dr}{d\phi}\right|_{\phi=180°} = -\Delta x$ |
| φ = 270° | $\left.\frac{dr}{d\phi}\right|_{\phi=270°} = \Delta y$ |

However, since equation (5) is further also linear for the desired offset values Δx and Δy, a multiple measurement of the change in absolute value for different, but now random angles φ also renders possible a direct determination of the two offset values. At least two independent single measurements are necessary. Disregarding other error sources, the two bridges supply the following signals, which are ideal apart from the offsets:

$$x=A. \sin \phi+\Delta x \quad (6)$$

$$y=A. \cos \phi+\Delta y \quad (7)$$

with:
A: joint signal amplitude
φ: electrical angle
Δx: offset of bridge x
Δy: offset of bridge y
The general calculation of the absolute sensor signal value first yields:

$$|r| = \sqrt{(A\sin\varphi + \Delta x)^2 + (A\cos\varphi + \Delta y)^2} \qquad (8)$$
$$= \sqrt{A^2 + 2A(\Delta x\sin\varphi + \Delta y\cos\varphi) + \Delta x^2 + \Delta y^2}.$$

Derivation of the gradient or change in absolute value of φ from this yields:

$$\frac{dr}{d\varphi} = \frac{A(\Delta x\cos\varphi - \Delta y\sin\varphi)}{\sqrt{A^2 + 2A(\Delta x\sin\varphi + \Delta y\cos\varphi) + \Delta x^2 + \Delta y^2}}. \qquad (9)$$

Taking into account that in general A>>Δx and Δy, which relation will be complied with increasingly well as the device is better tuned, equation (9) simplifies itself so as to equal equation (5):

$$\frac{dr}{d\varphi} = (\Delta x \cdot \cos\varphi - \Delta y \cdot \sin\varphi) \qquad (5)$$

The direct evaluation possibility of this equation for the given angles (0, 90, 180, and 270°) was pointed out above (cf. Table 1). The determination of the offset for any other angles requires the evaluation of at least two individual measurements of the change in absolute value for various angles. Assuming that the gradient of the absolute sensor signal value or the change in absolute value is determined for the angles $\varphi_1$ and $\varphi_2$, the following two linearly independent equations are obtained $$r'_1 = (\Delta x \cdot \cos\varphi_1 - \Delta y \cdot \sin\varphi_1), \qquad (10)$$

$$r'_2 = (\Delta x \cdot \cos\varphi_2 - \Delta y \cdot \sin\varphi_2). \qquad (11)$$

Subtraction of the two equations and solution with the use of addition theorems of trigonometric functions yield the following for Δx and Δy:

$$\Delta x = \frac{r'_2 \sin\varphi_1 - r'_1 \sin\varphi_2}{\sin(\varphi_1 - \varphi_2)} \qquad (12)$$

$$\Delta y = \frac{r'_2 \cos\varphi_1 - r'_1 \cos\varphi_2}{\sin(\varphi_1 - \varphi_2)} \qquad (13)$$

The trigonometric functions can also be determined very efficiently from a look-up table. It should be borne in mind, however, that equations (12) and (13) become singular not only for identical angles but also for angle differences of 180°. This results from the periodicity of the original equation (5) and should accordingly be taken into account in the implementation.

The absolute sensor signal value itself can be calculated without major additional effort, for example, within the framework of the CORDIC algorithm. The gradient or change in absolute value of φ is subsequently obtained, for example, by means of a digital differentiation filter. The following differentiation is carried out, for example, in this differentiation filter:

$$y(vT) = x(vT) - (1+c_0)x((v-1)T) \qquad (15)$$

With:
y(vT): output quantity of the filter at the instantaneous scanning moment
x(vT): input quantity of the filter at the scanning moment
x((v−1)T): input quantity of the filter at the last scanning moment $c_0$: coefficient defining the cut-off frequency of the filter
v: integer
T: scanning raster The differentiation and the low-pass filtering are carried out simultaneously with this differentiation equation in the differentiation filter.

It is necessary to take into account the value of the angle of the previous angle measurement for those angles which do not simplify the equation (5) mentioned above. This angle value is accordingly provided to the control unit 11, where it is stored, by the angle calculating device 6. The offset values Δx and Δy can then be calculated with the equations (12) and (13) after a second angle $\varphi_2$ has been calculated.

The change in absolute value or gradient $$\frac{dr}{d\varphi}$$

calculated in the differentiation filter 8 is supplied to a low-pass filter 9 so as to suppress interferences and high-frequency noise. The filtered absolute value change signal 19 is supplied to the controller 10. The controller 10 then calculates from the equations (12) and (13) the offset values of the relevant sensor signals x and y. Control signals 16 and 17 are generated from these offset values calculated by the controller 10, which control signals drive the adjustment devices 13 and 14 in the preamplifier stages 2 and 3. Said control signals are fed to the adjustment devices 13 and 14, which superimpose a DC voltage on the sensor signals x and y still affected by the offset values. An offset compensation is thus carried out in several steps, subject to the accuracy of the calculations of the angle and the absolute sensor signal value. A more accurate angle measurement can be carried out with this device for the measurement of angles. The intricate and once-only compensation of the static offset values as used in the prior-art arrangement becomes redundant thanks to this device.

What is claimed is:

1. A device for measuring an angle φ between a magnetic field and a magnetoresistive sensor (1) which supplies at least two mutually 90° phase-shifted electrical sensor signals which are supplied to an analog/digital converter (4), and downstream of which an angle calculating device (6) is connected, characterized in that the absolute value |r| of the two sensor signals x and y is calculated in a total calculation device (7) from the equation $|r|=\sqrt{y^2+x^2}$, in that a change in the absolute value of the sensor signals is determined in dependence on the calculated angle, and in that an offset control of the sensor signals x and y is carried out in dependence on said change in absolute value.

2. A device as claimed in claim 1, characterized in that controllable preamplifiers (2) and (3) are connected upstream of the analog/digital converter (4), which preamplifiers additively superimpose an externally provided DC voltage on the sensor signals x and y in dependence on a signal (18) representing the change in absolute value.

3. A device as claimed in claim 1, characterized in that the digitally converted sensor signals are modified by means of a digital correction signal calculated in dependence on a signal (18) representing the change in absolute value.

4. A device as claimed in claim 1, characterized in that the device (7) for calculating the absolute value is integrated with the calculation device (5), and in that the calculations of the absolute value and of the angle take place in parallel.

5. A device as claimed in claim 1, characterized in that offset values can be stored in a memory and can be called up when the device is started.

6. A device as claimed in claim 1, characterized in that the angle-dependent change in absolute value is low-pass filtered.

7. A device as claimed in claim 1, characterized in that a CORDIC algorithm can be used in the calculation device (5) for calculating the angle and absolute value.

8. A device as claimed in claim 1, characterized in that the angle-dependent change in absolute value is calculated continuously.

\* \* \* \* \*